United States Patent [19]

Pletcher

[11] Patent Number: 4,486,133
[45] Date of Patent: Dec. 4, 1984

[54] RETAINER FOR MECHANICAL FASTENER MEMBER

[75] Inventor: Donald L. Pletcher, Moraga, Calif.

[73] Assignee: Midland-Ross Corporation, Cleveland, Ohio

[21] Appl. No.: 323,732

[22] Filed: Nov. 23, 1981

[51] Int. Cl.³ .................. F16B 37/00; F16B 37/04
[52] U.S. Cl. .................................. 411/84; 411/337; 411/427
[58] Field of Search .............. 411/104, 427, 103, 84, 411/85, 112, 119, 120, 121, 123, 133, 371, 372, 531, 533, 544, 337, 368

[56] References Cited

U.S. PATENT DOCUMENTS

| | | | |
|---|---|---|---|
| 183,324 | 10/1876 | Pratt | 411/134 |
| 292,513 | 1/1884 | Shailer | 411/150 X |
| 1,655,104 | 1/1928 | Oakley | 411/533 X |
| 3,036,673 | 5/1962 | Santerre | 411/112 X |
| 3,346,032 | 10/1967 | Gulistan | 411/349 |
| 4,136,598 | 1/1979 | Hughes | 411/372 |

FOREIGN PATENT DOCUMENTS 321922 11/1929 United Kingdom ............... 411/133

*Primary Examiner*—Gary L. Smith
*Assistant Examiner*—Lloyd A. Gall
*Attorney, Agent, or Firm*—H. Duane Switzer

[57] ABSTRACT

A nut retainer for use with a structural member having a nut entrance channel defined between a pair of opposed shoulders or flanges of some predetermined thickness and a nut receiving channel disposed beneath the shoulders. The nut retainer has a generally frusto-conical body constructed from a resiliently deformable polymeric material with the body smaller diameter end fixedly secured to a rectangular nut upper face in a surrounding relationship with a threaded fastener receiving opening. The body larger diameter end is spaced from the nut upper face by some predetermined distance and has a diameter greater than the width of the structural member entrance channel. The retainer body is conformed such that the body exterior side wall will engage the structural member shoulders at areas therealong which are spaced from the nut upper face by a distance which is less than the thickness of the shoulders when the nut is inserted width-wise into the entrance channel. A force applied against the nut retainer causes it to be slightly deformed and allows simultaneous rotation of the nut and retainer 90 degrees so that the nut is captured in the receiving channel beneath the shoulders. When the force on the retainer is released, the retainer moves back toward its unstressed condition and causes the nut upper face to be drawn into an engaging relationship with the underside of the shoulders.

25 Claims, 6 Drawing Figures

RETAINER FOR MECHANICAL FASTENER MEMBER

BACKGROUND OF THE INVENTION

This invention pertains to the art of fasteners for structural members and, more particularly, to retaining means for such fastener members.

The invention is particularly applicable to a retaining device for nuts utilized in conjunction with strut-type structural members and will be described with particular reference thereto. However, it will be appreciated that the invention has far broader applications and may be employed for other purposes and/or adapted for use in other environments.

So-called strut-type or apertured structural members have been known and used in the art for many years. The structural members themselves are comprised of elongated channel elements having generally U-shaped cross-sections. In addition, a pair of inwardly-turned flanges or shoulders extend along the outer terminal ends of the channel element legs to define bearing seats for supporting loads. Typically, these structural elements are employed as struts which are sometimes cast in concrete or used as columns, cross-members, and so on in the construction of storage racks and the like. Also, they may be used to form simple support members for hanging other structural elements.

In many applications, a threaded fastener or a nut is received in the structural member channel for use in interconnecting the structural member to other members or elements. In that case, the fastener head or the nut has a generally rectangular configuration so that it may be inserted into the channel between the two inwardly-turned flanges or shoulders and thereafter rotated approximately 90 degrees so that the head or nut will engage the underside of the flanges. Because of the general conformation of conventional strut-type structural members, it is desired to provide means for locating and retaining threaded fasteners and/or nuts in a desired position therealong.

Heretofore, several alternative retaining means have been proposed and used. For example, U.S. Pat. No. 2,345,650 to Attwood discloses use of a coil spring interposed between the mechanical fastener head or nut and the bottom wall of the channel so that the head or nut is continuously urged toward engagement with the underside of the inwardly-turned flanges or shoulders. U.S. Pat. No. 3,493,025 to La Londe, et al. shows another type of attachment or retainer device comprised of a flanged retainer means cemented to the upper face of a nut for frictionally engaging the channel flanges or shoulders. Finally, U.S. Pat. No. 3,483,910 to La Londe, et al. shows a spring type device associated with the upper face of a nut member adapted to cooperate with the inwardly-turned flanges or shoulders of a channel element to perform a nut retention function.

While the foregoing examples of prior retaining devices have generally performed as desired, each has certain structural or operational shortcomings which detract from their use. For example, these prior devices require that special retaining grooves or the like be machined or otherwise formed in the fastener heads or nuts for accommodating special connecting means associated with the retaining devices. The necessity for machining or forming such retaining grooves or the like added production time and costs to the overall assembly. Moreover, the necessity for using special connecting means added further manufacturing time and costs. In the case where retaining devices were cemented to associated nuts, the cementing process required that a period of time be alloted to cement curing. Further, and because installation of the fasteners and nuts into the channel of a structural member requires that they be rotated approximately 90 degrees to effect retention, spring-type retaining devices may place residual biasing forces on the fasteners and nuts, tending to rotate them from the desired located position.

It has, therefore, been considered desirable to develop a new and improved retainer for mechanical fasteners and fastener receiving members. The subject invention is deemed to meet these needs and successfully overcome the foregoing problems as well as others. The subject new retainer is relatively inexpensive to manufacture and is readily installable in a fixed relationship to an associated fastener or fastener receiving member. Still further, the new retainer is adapted for use in a wide variety of different applications and/or environments.

BRIEF DESCRIPTION OF THE INVENTION

The present invention provides a new and improved retainer device for a mechanical fastener or a fastener receiving member which is to be used in a channel-type structural member. The device is adapted to retain the fastener or receiving member in a located position in the channel and is comprised of a generally frusto-conical body having the smaller end adapted to be secured by connecting means to one face of the fastener or receiving member. The larger end of the retaining body has a predetermined cross-sectional dimension and is spaced some predetermined distance from the smaller end. Also, the retaining body is constructed from a resiliently deformable material for allowing the generally frusto-conical body side wall to be selectively flexed or deformed.

In use, the retaining body side wall engages the inwardly-turned flanges or shoulders on an associated channel element as the fastener or receiving member is inserted thereinto. The conformation of the retaining body is such that an inward biasing force placed thereagainst slightly deforms the retaining body and allows the body to be simultaneously rotated for positioning the fastener or receiving member in a desired located position. Subsequent release of the biasing force causes the retainer body to move back toward its original conformation and draw the one face of the fastener or receiving member against the underside of the inwardly-turned flanges or shoulders.

In accordance with another aspect of the invention, the connecting means comprises a mounting bead extending peripherally around the retaining body adjacent the smaller end thereof. This bead is adapted to be retainingly received in a mounting groove disposed in the one face of the associated fastener or receiving member. In the preferred embodiment of the invention, the smaller end of the retainer body includes a collar portion extending axially outward therefrom to a terminal end with the mounting bead being disposed externally around this collar.

In accordance with still another aspect of the invention, the retaining body includes a pair of generally opposed through slots extending generally axially of the body side wall from the collar terminal end to a position at least transversely across the mounting bead. These slots allow selective radial flexure of the bead to facilitate installation of the bead into a mounting groove.

According to a further aspect of the invention, the mounting groove advantageously includes an undercut area which defines a retaining lip. The undercut area is adapted to receive the retainer body mounting bead and the retaining lip prevents axial separation of the retainer body from the fastener or fastener receiving member. If desired, protrusions extending radially inward from the retaining lip may penetrate the slotted areas on the retaining body to positively prevent relative rotation between the retaining body and the fastener or receiving member. In the preferred arrangement, the mounting groove surrounds and communicates with a fastener receiving opening in a fastener receiving member.

According to a more detailed aspect of the invention, the interior wall surface of the generally frusto-conical retainer body includes frictional gripping means. In the preferred arrangement, this gripping means comprises roughened areas on the body interior wall surface.

In accordance with still another limited aspect of the invention, the retaining body is constructed of a polymeric material. In the preferred arrangement, this polymeric material comprises a synthetic polyamide polymer.

The principal object of the present invention is the provision of a new and improved retainer for a mechanical fastener or fastener receiving member adapted to be used in an apertured structural member.

Another object of the invention is the provision of such a retainer which is simple in design, inexpensive to manufacture, and effective in use.

Still another object of the invention is the provision of a new retainer for a mechanical fastener or fastener receiving member which requires a minimum of machining to the fastener or receiving member for allowing the retainer to be fixedly secured thereto.

A further object of the invention is a new retainer device which facilitates ease of installation of a mechanical fastener or receiving member relative to an associated apertured structural member.

Additional objects and advantages for the invention will become apparent to those skilled in the art upon a reading and understanding of the following specification.

BRIEF DESCRIPTION OF THE DRAWINGS

The invention may take physical form in certain parts and arrangement of parts, a preferred embodiment of which will be described in detail in this specification and illustrated in the accompanying drawings which form a part hereof and wherein.

DETAILED DESCRIPTION OF THE PREFERRED EMBODIMENT

Figure 1:
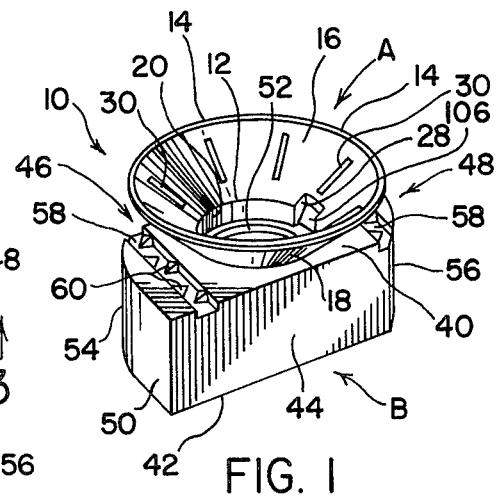
FIG. 1 is a perspective view of the subject new retainer as it is installed on a nut.
Figures 5, 6:
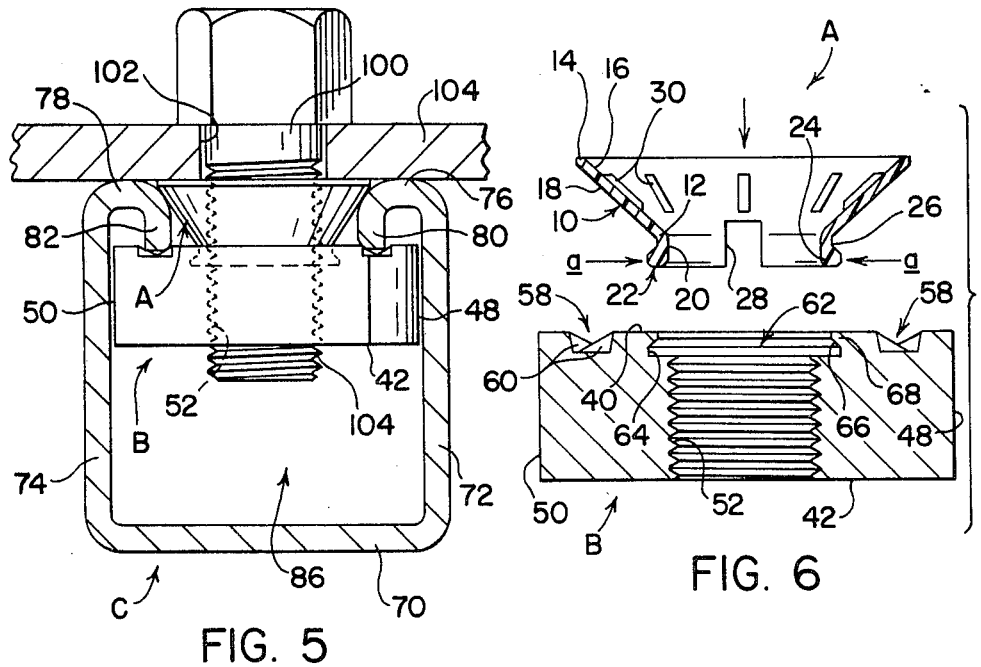
FIG. 5 is a partial cross-sectional view showing an apertured structural member with nut and nut retainer in one type of practical application; and, FIG. 6 is an exploded cross-sectional view showing details of a retainer and an associated nut.

Referring now to the drawings wherein the showings are for purposes of illustrating the preferred embodiment of the invention only and not for purposes of limiting the same, FIGS. 1 and 6 show a new retaining device A in conjunction with a nut B. Although shown with a nut cooperable with a threaded fastener, it will be appreciated that subject new retaining device could be alternatively adapted to use with the head of the threaded fastener itself or to use with entirely different types and styles of mechanical fastening devices.

More particularly, and with continued reference to FIGS. 1 and 6, retaining device A is comprised of a hollow or open generally frusto-conical body 10 having a smaller diameter end 12 and a larger diameter end 14. In the preferred embodiment, body 10 is constructed or molded from a resiliently deformable polymeric material with such material comprising a synthetic polyamide polymer. Other resiliently deformable materials could also be employed without in any way departing from the overall intent or scope of the present invention. It is, however, particularly desired that the particular material employed be stable at temperature extremes so that it will not crack or lose its resiliency.

Body 10 includes an internal surface 16, an external surface 18, and a collar-like area 20 adjacent smaller diameter end 12. As shown in the preferred embodiment, the side wall of body 10 between ends 12,14 has a straight taper. However, other configurations could also be satisfactorily employed. One such arrangement comprises an outwardly curving side wall. Collar 20 is generally cylindrical and extends axially outward of smaller diameter end 12 to a terminal end 22. An external mounting bead 24 extends circumferentially of collar 20 adjacent terminal end 22 thereof. This mounting bead has a somewhat circular cross-section and includes a planar upper surface 26 which tapers away from terminal end 22 over its lateral extent from the outer extremity of the bead to collar 20. Although a number of different taper angles could be suitably employed, an angle of approximately 45 degrees has been found to yield particularly advantageous results.

A pair of generally opposed through slots 28 (FIG. 2) are provided in body 10 to extend axially thereof a short distance from collar terminal end 22. While only one of slots 28 is shown in each of FIGS. 1 and 6, it should be appreciated that the other slot is generally oppositely disposed therefrom and identical thereto. If desired, a greater number of slots may also be employed. As best shown in FIG. 6, the slots extend an axial distance which at least traverses mounting bead 24 to facilitate radial flexure of the bead in a manner and for purposes to be described. Also, a plurality of frictional devices 30 are included on body internal surface 16 for gripping purposes as will also be described. While these frictional devices may take any number of different forms, including roughened areas and the like, slightly raised areas are utilized in the preferred embodiment.

Nut B has a generally rectangular configuration including spaced apart faces 40,42, opposed side walls 44,46, and opposed end walls 48,50. A generally centrally located threaded opening 52 communicates between opposed faces 40,42 for purposes of receiving a threaded fastener as will be described. The diagonally opposite corners of the nut are rounded or arcuate as at numerals 54,56 to accommodate nut installation into an apertured structural member as is known in the art. A pair of shoulder locating grooves 58 are included in nut face 40 and extend laterally between opposed side walls 44,46. These grooves are adapted to receive the flanges or shoulders on an associated apertured structural member as will be shown and described hereinafter. Each groove, in turn, includes serrations or teeth 60 which alternate transversely thereacross to enhance frictional engagement with the flanges or shoulders.

Referring particularly to FIG. 6, a circular mounting groove 62 is coaxially disposed about threaded opening 52 in nut face 40. Groove 62 has a larger diameter than opening 52 in order that retaining device A will not in any way interfere with a fastener received in opening 52. The mounting groove includes an area 64 which is undercut from nut face 40 in a predetermined manner to closely receive mounting bead 24 therein. Upper surface 66 of the undercut area is tapered at an angle compatible with the taper angle of bead upper surface 26, i.e., approximately 45 degrees, to enhance the close fitting relationship therebetween. Finally, a retaining lip 68 cooperates with bead 24 to prevent axial withdrawal of retaining device A from association with nut B.

Figure 2:
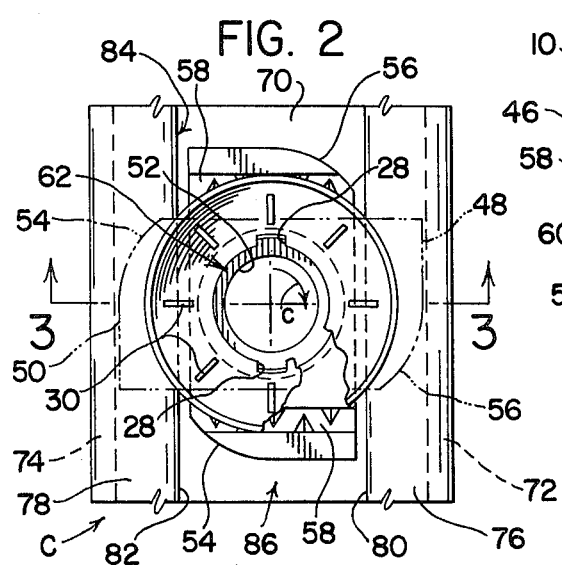
FIG. 2 is a plan view of the retainer-nut of FIG. 1 as it is installed into an associated apertured structural member, the initial position of installation being shown in solid lines and the final position of installation being shown in phantom.
Figure 3:
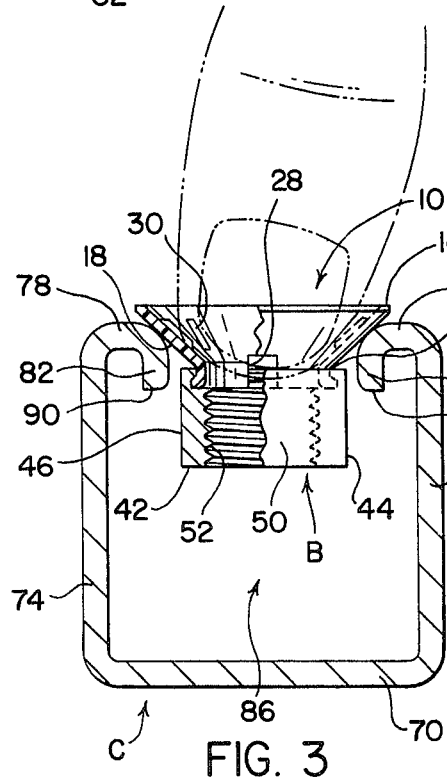
FIG. 3 is a side elevation on partial cross-section showing the initial installation position of FIG. 2.

With particular reference to FIGS. 2 and 3, a structural member with which retaining device A and nut B are adapted to be used is therein shown. In particular, this apertured structural member is generally designated C and is commonly referred to in the art as strut. The strut has a generally U-shaped cross-section comprised of a base 70 and spaced apart generally parallel legs 72,74, extending generally normal from the base. Inwardly-turned flanges 76,78 are disposed at the terminal ends of legs 72,74, respectively, and lips 80,82 extend into the U-shaped structural member from the terminal ends of flanges 76,78, respectively. The area laterally between lips 80,82 defines an elongated entrance area or channel 84 (FIG. 2) while the area between the interior of legs 72,74 defines an elongated receiving area or channel 86 (FIG. 3). Lips 80,82 terminate at inner ends 88,90 with the width of the lips generally establishing the overall effective thickness of the structural member shoulders. The construction for strut C shown in FIGS. 2 and 3 is conventional and well-known in the industry. The widths of entrance and receiving channels 84,86 and the thickness of the structural member shoulders are generally standard or otherwise known.

Continuing with reference to both FIGS. 2 and 3, and in using the retaining device A and nut B arrangement shown in FIGS. 1 and 6, it is desired that the width of nut B between side walls 44,46 thereof be slightly less than the width of entrance channel 84. The length of nut B between end walls 48,50 is greater than the width of channel 84 and preferably, only slightly less than the width of receiving channel 86. The lateral spacing between grooves 58 in nut face 40 is such that inner ends 88,90 of lips 80,82 may be received therein as will be described. Also, body smaller diameter end 12 is less than the width of entrance channel 84 and body larger diameter end 14 is greater than the width of the entrance channel.

Referring again to FIGS. 1 and 6, retaining device A is fixedly secured to nut B by means of a cooperative relationship between external mounting bead 24 and mounting groove 62. To achieve this association, radial biasing forces are exerted against collar 20 in the directions of arrows a-a in FIG. 6. Slots 28 in body 10 facilitate this radial compression which thus allows the mounting bead to be inserted into mounting groove 62 past lip 68. When the mounting bead is aligned with groove undercut area 64, the biasing force is released so that the mounting bead will radially expand back toward its normal conformation and be closely captured in the undercut area with bead upper surface 26 cooperatively engaging undercut top surface 66. Lip 68 which includes surface 66 acts to prevent undesired axial separation between retaining device A and nut B.

If mounting bead 24 and mounting groove 62 are closely toleranced relative to each other, retaining device A will be fixedly retained so that it is very difficult to cause relative rotation between the mounting bead and mounting groove. However, in order to positively prevent such relative rotation, lip 66 may be staked at areas thereof communicating with slots 28 in retaining body 10 so that, in effect, small protrusions from the lip extend through the slots. One such protrusion is shown in FIG. 1 and designated by numeral 106. In order to obtain radial compression of the mounting bead, a special jig or fixtures may advantageously be employed. Although not comprising a part of the present invention, such a jig or fixtures would enhance overall productivity in implementing use of the subject new retaining device.

When retaining device A is installed on nut B as shown in FIG. 1, nut face 40 and external surface 18 of body 10 define retaining means which cooperate with structural member C for retaining nut B in a desired position along receiving channel 86 (FIG. 3) adjacent entrance channel 84 (FIG. 2). More particularly, the taper of the body 10 side wall between smaller and larger diameter ends 12,14 is chosen to yield a predetermined spacial relationship relative to nut face 40. While the taper angle may vary as a function of the strut size and/or dimensioning, the straight taper body 10 shown in the FIGURES has an apex angle of approximately 96 degrees. This angle is deemed to yield particularly satisfactory results when conventional strut conformations are involved. The taper angle may, however, be varied as deemed necessary and/or appropriate to accommodate alternative applications and/or environments of use. The specific relationship between body 10, nut face 40, and the shoulders of apertured structural member C will become more readily apparent in the following discussion.

Figure 4:
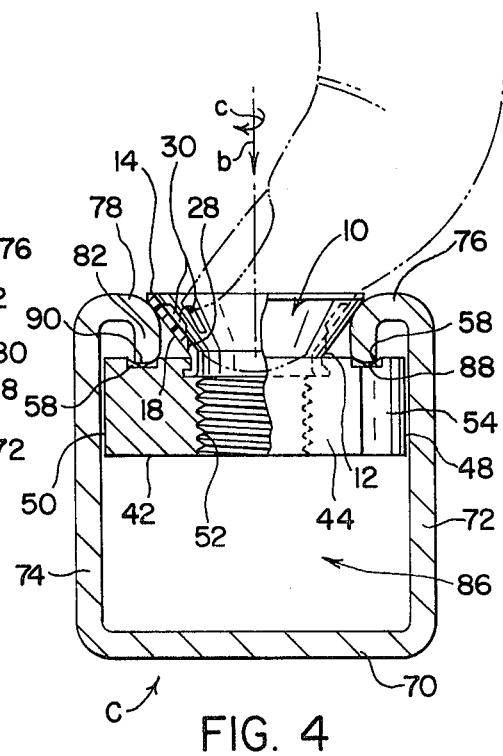
FIG. 4 is similar to FIG. 3 showing the final installation position of FIG. 2.

FIGS. 2, 3, and 4 show retaining device A and nut B as they are installed on structural member C with the nut being disposed and retained in some predetermined desired location. First, and with reference to FIGS. 2 and 3, the nut is inserted width-wise into entrance channel 84 until external surface 18 of body 10 engages shoulders or flanges 76,78. In this position, and as shown in FIG. 3, the relationship between nut face 40, body 10 and the effective thickness of the structural member shoulders is such that face 40 is disposed above lip inner ends 88,90. Such a relationship is highly desirable in order that the nut may ultimately be retained in a desired position. Once the retaining device and nut are located as shown in solid lines of FIG. 2 and in FIG. 3, the installer may insert his thumb into body 10 against internal surface 16 thereof.

Next, and with reference to FIGS. 2 and 4, the installer places a biasing force against body 10 in the direction of arrow b so that the body is resiliently deformed against the structural member shoulders and nut face 40 is moved to a position approximately level with or slightly below inner ends 88,90 of lips 80,82. At the same time, the installer rotates his thumb in direction c so that the nut is moved to a position where its length extends laterally of receiving channel 86. Frictional devices 30 on body internal surface 16 facilitate such rotation with a minimum of slippage between installer's thumb and the retaining device. The rounded or arcuate areas 54,56 at diagonally opposite corners of the nut facilitate such rotation and prevent interference with interior surfaces of legs 72,74 as is best shown in phantom in FIG. 2. When moved to the phantom line position of FIG. 2, and as best shown in FIG. 4, shoulder locating grooves 58 are in longitudinal alignment and communication with inner ends 88,90 of lips 80,82.

Once nut B is in the position of FIG. 4, the biasing pressure exerted by the installer may be released. Such release causes body 10 of the retaining device to move back toward its normal unstressed condition against the structural member shoulders and thereby draw the nut into engagement with the structural member at the areas of shoulder locating grooves 58 and lip inner ends 88,90. At the same time, the side wall of body 10 is restrained by flanges 76,78 at generally the area of intersection with lips 80,82, respectively. Because of the dimensional relationships as described above with regard to the body side wall, nut face 40 and lips 80,82, body 10 will remain in a partially stressed condition and thus retain nut B in the position and at the location along structural member C where it was installed.

FIG. 5 shows the nut installation of FIG. 4 as it is used for purposes of maintaining structural member C fixedly secured to some other structural member. In that regard, an elongated threaded fastener 100 is shown as passing through an opening 102 in a plate or other structural member 104. The threaded fastener includes threads 104 compatible with the threads of nut opening 52 in order to be threadedly received thereby. As the threaded fastener is threadedly advanced into nut B, the nut is prevented from rotating in receiving channel 86 due to the interference relationship created between the diagonally opposite square corners of the nut (FIG. 2) and the interior surfaces of structural member legs 72,74. Furthermore, threaded fastener 100 may be advanced into nut B until the upper surfaces of flanges or shoulders 76,78 positively engage or bear against the surface of plate 104. Because retainer body 10 is constructed of a polymeric material, it will not interfere with this engaging or bearing relationship since body 10 may simply be further deformed or crushed.

Although the subject new retainer has been described with reference to use with a nut for receiving a threaded fastener and in the environment of an apertured structural member, it will be readily appreciated that the inventive concept involved has far broader applications. The concept may be readily adapted to use with the head of a threaded fastener as well as with other types and styles of mechanical fasteners in a variety of different environments. Such modifications are not deemed to in any way depart from the overall intent or scope of the recent invention.

The improved channel nut of the present application has a multitude of advantages to mechanics working with same in the field. By way of example, a workman standing on a ladder or other support can reach out with one hand and install or remove the nut without requiring the use of any special tool.

Once the nut is installed, the polymer retainer facilitates movement of the nut along the channel to a desired location for alignment with other devices. This is because the coefficient of friction between the retainer and channel is much lower than between metal retainers and the channel. In addition, it is very simple to push on the retainer with a thumb or finger to release the toothed grooves of the nut from engagement with the channel lips, and to then slide the nut and retainer along the channel. No tools of any kind are required for these operations.

The conical shape of the retainer and its smooth surface also guides bolts into the threaded hole in the nut. When there is some misalignment between the nut and a bolt, the retainer brings the parts into alignment.

In prior art arrangements using metal springs between the nut and the channel bottom, sliding movement of the fastener assembly to a desired location is very difficult when the channel is of the type having holes in its bottom because the spring hangs up on the holes. Other metal spring-type retainers frequently have sharp edges which damage the paint or other protective coating when the nut is installed or moved to a desired location. Such damage can result in undesirable rusting of the channel.

The invention has been described with reference to the preferred embodiment. Obviously, modifications and alterations will occur to others upon the reading and understanding of this specification. It is intended to include all such modifications and alterations insofar as they come within the appended claims or the equivalents thereof.

Having thus described the invention, it is now claimed:

1. A retaining device in combination with mechanical fastener member adapted to retain the fastener member in a located position in an apertured structural member, said retaining device comprising:
    an open, generally frusto-conical retaining body having a side wall extending between a first smaller body end and a second larger body end, said second end being spaced a predetermined distance from and having a predetermined greater cross-sectional dimension than said first end; connecting means integral with said body adjacent said first end adapted to cooperate with the mechanical fastener retaining member at one face thereof for fixedly connecting said body to the fastener retaining member, said connecting means comprising a mounting bead extending circumferentially of said body and adapted to be selectively retainingly received in a groove disposed in one face of the mechanical fastener retaining member; and, said retaining body being constructed from a resilient material for allowing the said side wall to be selectively radially deformed while preventing effective axial expansion during use.

2. The retaining device as defined in claim 1 wherein the body side wall has a generally straight-line taper between said first and second ends.

3. The retaining device as defined in claim 1 wherein said mounting bead is disposed externally of said body.

4. The retaining device as defined in claim 1 further including a pair of generally opposed through slots extending generally axially of said body side wall from said first end at least traversing across said mounting bead for allowing selective radial flexure of said bead during mounting of said body to the mechanical fastener retaining member and to prevent rotation of said body in the fastener retaining member.

5. The retaining device as defined in claim 1 wherein said body first end includes a collar portion extending axially outward therefrom to an outermost end, said mounting bead being disposed on said collar.

6. The retaining device as defined in claim 5 wherein said mounting bead extends around said collar externally thereof and said body includes a pair of through slots extending axially from said collar outermost end at least traversing across said mounting bead.

7. The retaining device as defined in claim 6 wherein said mounting bead is disposed adjacent said collar outermost end, said bead having an outer side surface and an upper surface tapering from said outer side surface to said collar in a direction away from said outermost end.

8. The retaining device as defined in claim 7 wherein said bead upper surface has a taper angle of approximately 45 degrees relative to the plane of said collar outermost end and the apex angle of said frusto-conical body is approximately 96 degrees.

9. The retaining device as defined in claim 1 wherein the interior wall surface of said generally frusto-conical body includes frictional gripping means.

10. The retaining device as defined in claim 9 wherein said frictional gripping means comprises roughened areas.

11. The retaining device as defined in claim 1 wherein said body is constructed from a polymeric material.

12. The retaining device as defined in claim 11 wherein said polymeric material comprises a synthetic polyamide polymer.

13. A device adapted for retaining a mechanical fastener member in a desired located relationship in an apertured structural member having a pair of shoulders extending along opposite sides of an aperture entrance area, said device comprising in combination:
 a mechanical fastener member having a pair of opposed faces with one of said faces including a retaining body mounting groove therein;
 a hollow retaining body constructed from a resiliently deformable material to have a generally frusto-conical shape with spaced apart smaller and larger diameter ends, said smaller end having a cross-sectional dimension at least slightly less than the width of the entrance channel in an apertured structural member with which said fastener member is adapted to be associated, said retaining body further including integral connecting means comprising an external connecting bead disposed circumferentially of said body adjacent said smaller end closely received in said mounting groove for placing said fastener member and retaining body in a fixedly connected relationship with each other; and,
 said fastener member one face and the outer surface of said frusto-conical retaining body defining retaining areas adapted to cooperate with opposite sides of a pair of shoulders extending along the opposed side edges of an aperture entrance area in an apertured structural member for retaining said fastener member in a located position therealong.

14. The combination as defined in claim 13 wherein the diameter of said retaining body larger end is greater than the diameter of said smaller end by some predetermined amount and is spaced from said smaller end by some predetermined distance.

15. The combination as defined in claim 13 wherein said mounting groove includes an undercut area defining a retaining lip at said one face, said connecting bead being configured for close retaining receipt of said groove undercut area, said retaining lip preventing disassociation of said fastener member and retaining body in a direction normal to said face.

16. The combination as defined in claim 15 wherein said retaining body further includes a pair of generally opposed through slots extending generally axially of said body side wall from said smaller end to a position at least traversing said connecting bead for allowing selective radial deformaton of said body smaller end to facilitate insertion of said connecting bead into said mounting groove.

17. The combination as defined in claim 16 wherein said retaining body further includes a generally cylindrical collar portion extending axially outward from said smaller end to an outer end, said connecting bead being disposed externally around said collar portion with said through slots extending axially from said outer end.

18. The combination as defined in claim 16 further including retention means cooperating between said body through slots and said retaining lip for positively preventing relative rotation between said body and said fastener member.

19. The combination as defined in claim 16 wherein said fastener member comprises a fastener receiver having a fastener receiving opening extending therethrough between the opposed faces thereof, said mounting groove being disposed in said one face in a surrounding relationship with said receiving opening.

20. The combination as defined in claim 13 wherein the interior wall surface of said hollow retaining body includes frictional gripping means.

21. The retaining means as defined in claim 13 wherein said retaining body is constructed from a polymeric material.

22. A device in combination with a nut for retaining said nut at a preselected located position along an apertured structural member including a pair of retaining shoulders having some predetermined thickness and extending in a parallel spaced apart relationship for defining an aperture entrance area therebetween, said structural member having a nut receiving area disposed at the underside of said shoulders which is greater in width than said entrance area and wherein said nut has a width dimension less than the width of said entrance area and a length dimension greater than the width of said entrance area with a threaded opening extending through said nut between opposed faces thereof adapted to retainingly receive a threaded fastener, said device comprising:
 a hollow generally frusto-conical retaining body constructed from a resilient deformable material to have a smaller diameter first end portion secured to one face of said nut by integral connecting means positioned in surrounding relationship with said opening and a larger diameter second end portion spaced normally outward from said one face, the diameter of said first end portion being less than the width of said structural member entrance area and the diameter of said second end portion being greater than the width of said entrance area, a side wall of said retaining body engaging said structural member shoulders at areas spaced from said nut one face toward said body second end portion by a distance less than the predetermined thickness of said shoulders, whereby said nut may be inserted width-wise into said entrance area until said retaining body engages said shoulders and a biasing force thereafter applied against said retaining body in a direction toward said nut receiving area for temporarily radially deforming without effecting axial expansion of said retaining body while simultaneously rotating said retaining body and nut to a position wherein the length dimension of said nut extends generally laterally of said nut receiving area, release of the biasing force against said retaining body allowing said body to return toward its frusto-conical conformation and cause said nut one face to be placed in located engagement with the underside of said shoulders; and, said nut one face having a mounting groove surrounding said threaded opening with said groove including an undercut bead receiving area and a retaining lip, said retaining body including an external circumferential connecting bead adjacent said first end portion captured in said undercut area by said lip for retaining said nut and locating member in connected association with each other.

23. The device as defined in claim 22 wherein said retaining body further includes means adjacent said first end portion for allowing selective radial deformation of said connecting bead.

24. The device as defined in claim 23 wherein said retaining body further includes a generally cylindrical collar extending axially outward of said first end portion, said connecting bead being disposed around said collar with said allowing means comprising a pair of generally opposed through slots extending axially of said retaining body from the collar outer end at least traversing through said connecting bead.

25. The device as defined in claim 22 wherein said locating member is constructed from a polymeric material and the interior surface thereof includes frictional gripping means.

* * * * *